Nov. 2, 1971    L. S. E. BERGSTROM    3,616,736
DEVICE SUPPLYING FILM SHEETS TO A FILM EXCHANGER
Filed Dec. 29, 1969    2 Sheets-Sheet 1

INVENTOR
LENNART S. E. BERGSTROM
Richards & Geier
ATTORNEYS

Nov. 2, 1971  L. S. E. BERGSTROM  3,616,736
DEVICE SUPPLYING FILM SHEETS TO A FILM EXCHANGER
Filed Dec. 29, 1969  2 Sheets-Sheet 2

INVENTOR
LENNART S. E. BERGSTROM
Richards & Geier
ATTORNEYS

# United States Patent Office 3,616,736
Patented Nov. 2, 1971

3,616,736
DEVICE SUPPLYING FILM SHEETS TO A
FILM EXCHANGER
Lennart S. E. Bergstrom, Solna, Sweden, assignor to
Siemens Aktiengesellschaft, Erlangen, Germany
Filed Dec. 29, 1969, Ser. No. 888,536
Claims priority, application Sweden, Jan. 15, 1969,
501/69
Int. Cl. G03b 19/10
U.S. Cl. 95—19                                2 Claims

ABSTRACT OF THE DISCLOSURE

A device for the magazine which transmits film to a film exchanger is characterized in that the magazine is provided with a film holder wherein separate film sheets are held by spring pressure between discs forming a pile. An arm actuated by the film exchanger has a claw penetrating into a recess of the disc pile in such manner that the claw engages a film sheet at its rear edge and pulls it out through a slit in the magazine in the direction of the illuminated field of the film exchanger. Guides are located in the magazine at opposed side edges of the film sheets. These guides hold down the sheet edges and impart to the film sheets a curved shape and greater stability.

---

The invention relates to a device provided in magazines transmitting flat film sheets to film exchangers.

In existing film exchangers the supply of film from a transmitting magazine to the illuminated field of the exchanger usually takes place by means of transporting wheels and counter pressure rollers cooperating therewith and engaging a film which has left the magazine through a slit provided in the end wall of the magazine.

An object of the present invention is to improve existing constructions.

Another object is to provide a safe and secure delivery of a film sheet from a magazine even when the film sheets have different stiffnesses and even when the sheets, for example as the results of absorbed into moisture have the tendency of not staying flat.

Other objects of the present invention will become apparent in the course of the following specification.

In the accomplishment of the objectives of the present invention it was found desirable to provide the magazine with a film holder in which the separate film sheets are held by spring pressure between discs forming a pile. An arm actuated by the film exchanger has a claw adapted to penetrate into a recess of the disc pile in such manner that the claw engages one of the film sheets at its rear edge and pulls it through a slit in the magazine in the direction of the illuminated field of the film exchanger. Guides are located in the magazine at opposed side edges of the film sheets which hold down the sheet edges and impart a curved shape as well as greater stability to the film sheets.

The invention will appear more clearly from the following detailed description when taken in connection with the accompanying drawings showing by way of example only, a preferred embodiment of the inventive idea.

Figure 1:
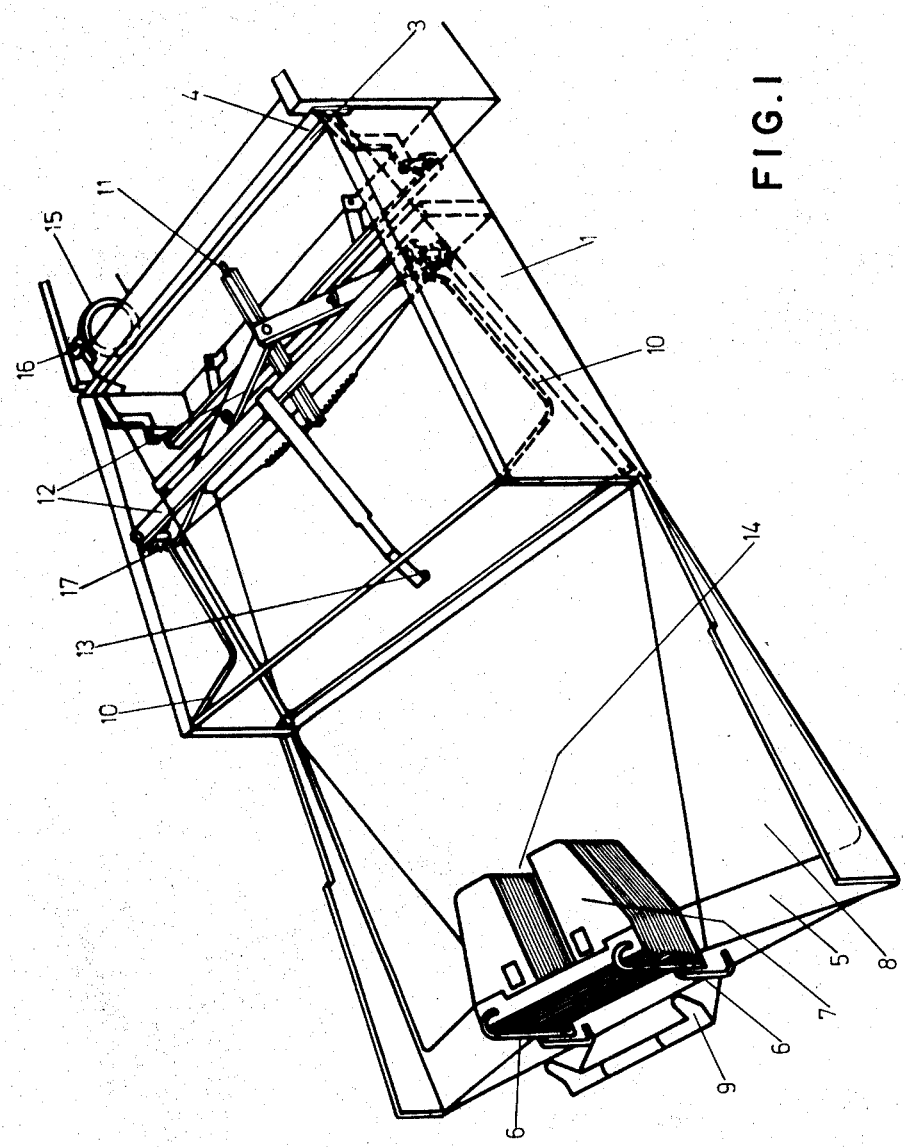
FIG. 1 is a perspective view of a transmitting magazine with the insert ledge shown as being pulled out and the cover removed.

The film transmitting magazine shown in the drawings consists of a box 1 having side and end walls and a bottom made, for example, of thin metal sheets and a cover 2 (FIG. 2) which provides impermeability to light after the magazine is loaded with X-ray film in a dark room. After the insertion of the box into the film exchanger a blind 4 is swung upwardly to expose a slit 3 in one end wall of the box through which the film sheets located in the magazine are introduced one after the other into the film exchanger.

Within the box 1 there is an insert ledge 5 carrying two vertical loops 6 located upon the ledge away from the film exchanger. A number of substantially U-shaped discs 7 having openings directed toward the film exchanger, are mounted in the loops 6. X-ray films 8 are guided individually between these discs and are held with a certain amount of pressure by a resilient closure 9 which lies against the disc staple and can be swung upwardly.

Figure 3:
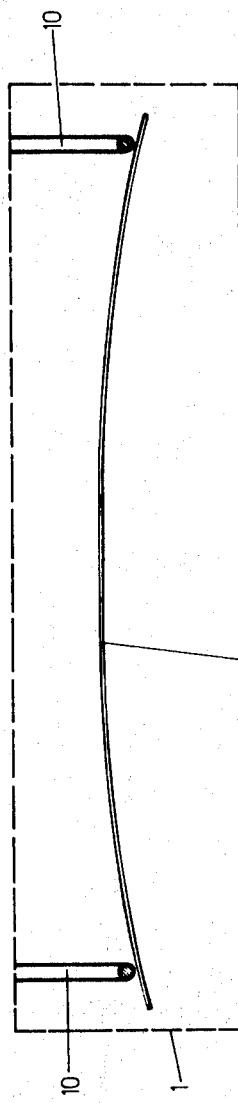
FIG. 3 is a transverse section along the line III—III of FIG. 2 and shows the manner in which a stabilized curved shape is imparted to the film sheets.

Guides 10 which curves downwardly are located in the box 1 close to its opposed side edges. When the insert ledge 5 is pushed into the box the guides press downwardly opposed side edges of the film sheets 8 in such manner, that the film sheets will have a curved shape, as shown in FIG. 3. Due to this curved shape the films receive a greater stability which facilitates their entry into the film exchanger; furthermore, scratches upon the extremely sensitive outer suurface are avoided since each top film engages only edges of an underlying film.

Figure 2:
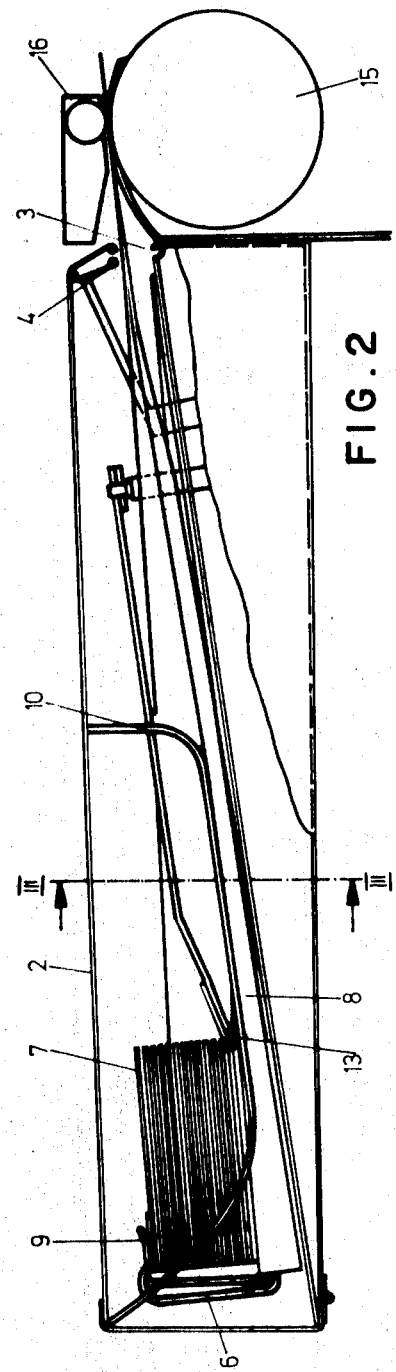
FIG. 2 is a longitudinal section through the magazine and shows the way in which film sheets are pulled out of the magazine.

As shown in FIG. 2, the guides 10 do not extend quite to the film exchanger, with the result that the film sheets 8 can return into a flat or practically flat shape during the remaining free part of their forward movement, so that delivery is facilitated.

The delivery takes place by an arm which is actuated by the film exchanger through a rod 11 and a lever mechanism 12, an end of the arm carrying a downwardly directed gripping claw 13. During the forward movement of the arm, the claw is introduced into the central recess 14 of the U-shaped discs 7; it will engage one of the film sheets 8, beginning with the top sheet, and will pull it out of the box 1 through the open slit 3, so that it can be engaged by the transporting wheels 15 and counter pressure rollers 16 to be transported into the illuminating field of the film exchanger. A spring 17 then pushes the claw 13 downwardly against the next film.

I claim:
1. A device for transmitting film sheets having a substantially flat shape to a film exchanger, said device comprising a magazine having opposed side and end walls and a bottom, one of said end walls having a slit therein, a film holder located within said magazine comprising a plurality of superposed discs having recesses therein, resilient means within said magazine pressing said discs against each other, said film sheets being adapted to be inserted individually between said discs, an arm within said magazine, a claw carried by one end of said arm, means within said magazine actuating said arm to cause said claw to move into said recesses, to engage a film sheet and to pull the film sheet out of the magazine through said slit toward the film exchanger, and guides located within said magazine adjacent said side walls for engaging and pressing opposite edges of the film sheet pulled by said claw toward said bottom so as to cause said film sheet to assume a curved shape.

2. A device in accordance with claim 1, wherein said guides terminate within said magazine at a distance from said slit, whereby film sheets moving through said distance reassume a substantially flat shape.

References Cited
UNITED STATES PATENTS

| | | | |
|---|---|---|---|
| 2,483,578 | 10/1949 | Gallistel, Jr. | 95—23 |
| 2,652,498 | 9/1953 | Snook et al. | 95—19 UX |
| 3,350,990 | 11/1967 | Finelli et al. | 95—19 X |

SAMUEL S. MATTHEWS, Primary Examiner

R. M. SHEER, Assistant Examiner